US012579172B2

(12) United States Patent
Padilla Ortiz et al.

(10) Patent No.: US 12,579,172 B2
(45) Date of Patent: Mar. 17, 2026

(54) GEOLOCATION NAME SYSTEM

(71) Applicant: SOCIAL SOLUTIONS LLC, Guaynabo, PR (US)

(72) Inventors: Juan Antonio Padilla Ortiz, Bayamon, PR (US); Wendolin Bosques Cruz, Guaynabo, PR (US); Efrain Enrique Longart Martin, San Juan, PR (US)

(*) Notice: Subject to any disclaimer, the term of this patent is extended or adjusted under 35 U.S.C. 154(b) by 0 days.

(21) Appl. No.: 17/949,200

(22) Filed: Sep. 20, 2022

(65) Prior Publication Data

US 2023/0025477 A1    Jan. 26, 2023

Related U.S. Application Data

(63) Continuation-in-part of application No. 17/132,377, filed on Dec. 23, 2020, now Pat. No. 11,449,532.

(60) Provisional application No. 62/955,642, filed on Dec. 31, 2019.

(51) Int. Cl.
| | |
|---|---|
| *G06F 16/00* | (2019.01) |
| *G06F 16/22* | (2019.01) |
| *G06F 16/25* | (2019.01) |
| *G06F 16/29* | (2019.01) |

(52) U.S. Cl.
CPC .............. *G06F 16/29* (2019.01); *G06F 16/22* (2019.01); *G06F 16/258* (2019.01)

(58) Field of Classification Search
CPC .... G06F 16/22; G06F 16/2379; G06F 16/258; G06F 16/29
See application file for complete search history.

(56) References Cited

U.S. PATENT DOCUMENTS

| | | | | |
|---|---|---|---|---|
| 9,729,381 | B2 * | 8/2017 | Hancock | H04L 61/45 |
| 10,007,739 | B1 * | 6/2018 | Gundersen | G06F 16/90344 |
| 2003/0216143 | A1 * | 11/2003 | Roese | H04W 4/20 |
| | | | | 455/456.2 |
| 2008/0153517 | A1 * | 6/2008 | Lee | H04W 4/02 |
| | | | | 455/457 |
| 2012/0113804 | A1 * | 5/2012 | Zhang | H04L 69/40 |
| | | | | 370/228 |
| 2014/0218404 | A1 * | 8/2014 | Kreft | G01C 3/08 |
| | | | | 345/636 |
| 2016/0109577 | A1 * | 4/2016 | Bin Kenaid | G01S 19/41 |
| | | | | 701/469 |
| 2016/0323241 | A1 * | 11/2016 | Jones | H04W 4/029 |

(Continued)

*Primary Examiner* — Dinku W Gebresenbet

(74) *Attorney, Agent, or Firm* — Eugenio J. Torres-Oyola; Victor M. Rodriguez-Reyes; Rafael Rodriguez-Muriel

(57) ABSTRACT

A system and method for representing physical coordinates related to an address in machine readable format, such that said identifier may be used to share location information in lieu of a regular address (street name, city, state, etc.). The system and method comprise assigning an identifier to a first address, dynamically receiving a first set of geographical coordinates related to the first address, wherein the first set of geographical coordinates are measured at a first time period; dynamically receiving a second set of geographical coordinates related to the subject, wherein said second set of geographical coordinates are measured at a second time period; substituting said first set of geographical coordinates with said second set of geographical coordinates; and correlating in a database the second set of geographical coordinates with the identifier.

20 Claims, 2 Drawing Sheets

(56) References Cited

U.S. PATENT DOCUMENTS

| | | | | |
|---|---|---|---|---|
| 2017/0366647 A1* | 12/2017 | Pepper | ................ | G06F 16/9537 |
| 2018/0189791 A1* | 7/2018 | Filali | ...................... | G06Q 30/04 |
| 2019/0036954 A1* | 1/2019 | Garcia | .................... | H04L 63/20 |

* cited by examiner

GEOLOCATION NAME SYSTEM

PRIORITY

This application claims priority from U.S. Provisional Application 62/955,642, filed on Dec. 31, 2019 and Non-Provisional application Ser. No. 17/132,377 filed on Dec. 23, 2020, which the contents of which are fully incorporated by reference.

BACKGROUND OF THE INVENTION

Field of the Invention

The present invention lies in the field of geolocation services and mapping. Particularly, the present invention is directed to a system and method for using words to dynamically represent physical coordinates, allowing for an easier way to remember and communicate precise geographical locations. The system comprises a centralized database containing physical coordinates correlated to an identifier (email, phone number, domain name, or similar), as well as additional location information, wherein said database may be accessed by external applications, allowing easy sharing of precise geolocation data.

Discussion of the Background

Physical addresses are becoming obsolete. Following road names used to be how we navigated, and getting a paper map was standard procedure for travelers everywhere. Today, you can fly to a foreign city and drive to a specific place without caring much about road names. When global positioning systems (GPS) became widely available in the 2000s, road names became less important because simple geolocation pins could provide better accuracy. Unfortunately for road names, modern systems cannot use physical addresses directly; they have to be translated into machine-ready coordinates.

Physical addresses and geolocations deficiencies have been identified as a major infrastructure issue. A similar issue is costing the mailing industry millions of dollars per year. Geolocation is becoming more important in this new mobile world. Already critical for reaching a business, picking up a passenger, delivering a package, and transporting a student, it will be even more important with autonomous vehicles, robots, and drones.

GPS technology provides an easily accessible way to find your location on Earth using latitude and longitude coordinates. For example, an office may be found at 18.4133275, −66.0983674, but those numbers cannot be memorized that easily. Something similar happened with the Internet and its four-segment Internet Protocol (IP) addresses. Technically, all you need to connect to an Internet server is an x.x.x.x IP address, but a domain name system (DNS), where the IP address is bound to a human-readable name (e.g., google-.com instead of 216.58.219.142), makes connecting easier and memorable.

An object of the present invention is a geolocation name system (GNS). By using this system, users are able to reach an office at, for example, companydomain.com:office, instead of using coordinates—a direct, easy-to-remember, and unambiguous method. GNS is a personalizable, open, and dynamic name directory. Because geo-names are not tied to fixed locations, their underlying data can be dynamic, with powerful capabilities for automatic updates and tracking, plus potential for enabling development of programmable solutions. Multiple geo-names can be bound to Internet domains, phones or emails for portability across operating systems, devices, and apps.

Examples of scenarios where it is crucial that destination addresses are more accurate are:

A student transportation company responsible for 11,000 students on regular and special education tracks—Students are picked up from predetermined locations and left at predetermined schools, but changes to a student's home or school locations (moving between grades) can affect bus routing. Transportation of special education students is more complex, especially when they require moving to additional services, such as therapies, doctor's appointments, and other specialized services.

A non-emergency medical transportation provider that transports mostly senior citizens to medical appointments and other engagements at a rate of more than 50,000 trips per month—Most senior citizens have limited technology experience, so the provider has to interact with concerned family members, making the pickup and delivery points more challenging.

A food distributor that delivers refrigerated dairy products to more than 12,000 customers every week—Dairy products have a short shelf life, so it is critical to get the products from manufacturing to retail as quickly as possible.

At present, processing physical addresses through software means provides inconsistent and inaccurate results, making the experience less than ideal and requiring human analysis to reach the desired destination. Therefore, there is a need for a centralized system that allows for accurate and easy sharing of geolocation information.

DESCRIPTION OF THE PRIOR ART

Geo-names provide direct access to geolocation information instead of the current search process. Other initiatives are also pushing for adoption of grid systems superimposed on latitude/longitude using a combination of letters, numbers, or words to make coordinates easier to work with. They make addresses somewhat more memorable. For example, what3words uses a grid of 3 meters by 3 meters and assigns a three-word combination to each cell. An office address using what3words is "smudges.hood.kinds." As the grid focuses on fixed locations, a fairly accurate converter can be developed between grid systems (limited by grid resolution). Other grid initiatives with varying levels of acceptance include Plus Codes, Mapcode, US Military Grid, and NAC Locator.

Another advantage of grids is that they can be used offline, especially in emergency situations or where communications are limited. Entering the grid code can pinpoint a location on an offline map, similar to directly entering latitude/longitude coordinates.

However, context and personalization are missing. It's like getting a four-digit PIN from the bank for your debit or credit card. You have a much higher probability of forgetting that PIN than a PIN that you discretely select. The present invention makes names memorable by focusing on personalization.

Major app providers have recognized this issue and developed proprietary solutions. A user can drive to his "favorite" home using Waze, request Uber to get to a "saved places" home, or ask Grab to get a burrito to the "starred" home. But because the information is stored in proprietary islands of information, if you move to a new home you may update your Waze information, but that burrito may still be delivered by Grab to your former house.

Systems currently in the art related to geolocation names do not solve the problem of having to use physical coordinates. For example, U.S. Patent Application No. 2011/0029398 discloses a geolocation name system that maps a location's coordinates to a geographic region that contains the location information regarding the owners and occupants of that region, where these entities could be persons or organizations. The system then returns URLs of websites or data feeds (Web Services), email addresses, Instant Messaging addresses, phone numbers and other data associated with the entities. This solution is helpful in that it provides information regarding the entity or person that is related to a location. However, this system requires sending the coordinates to a server, and does not allow users to easily share information about a location with a name.

U.S. Patent Application No. 2009/0100005 discloses network address mapping system that can identify a set of Web pages, collect information from the Web pages indicating geographical locations, and correlate the geolocations with the network addresses from which the identified Web pages are served. The collected information can then be used to identify a geolocation. This system, however, relies on information disclosed inside a web page, which may not be related to the desired location, leading to inaccurate results and information.

U.S. Pat. No. 9,883,333B2 discloses a method of producing a location identifier comprising a set of words. The generated identifier converts geographical coordinates comprised of a set of latitude and longitude values into a set of words that identify said coordinates. This invention disclosed in U.S. Pat. No. 9,883,333B2 aids in sharing location information in a simpler way, as word sets are easier to communicate than coordinates. However, as every set of words is determined based on location, specific sets of words are tied to specific locations, and they may not be updated by users in such a way that allows dynamically retrieving updated location information related to the set of words. For example, if a restaurant updates its location, the set of words that pointed to the location of said restaurant stays pointing at that location, which may now by an empty lot.

The present solutions are not universal and are restricted to their respective applications. Therefore, a new solution is needed that provides a dynamic correlation of an identifier with a location and other location-related information, which may be used by any application and allows users to easily share their location.

BRIEF SUMMARY

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

When the word "invention" is used in this specification, the word "invention" includes "inventions", that is, the plural of "invention". By stating "invention", the Applicant does not in any way admit that the present application does not include more than one patentable and non-obviously distinct invention and Applicant maintains that the present application may include more than one patentably and non-obviously distinct invention. The Applicant hereby asserts, that the disclosure of the present application may include more than one invention, and, in the event that there is more than one invention, that these inventions may be patentable and non-obvious one with respect to the other.

Further, the purpose of the accompanying abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

The following application discloses a system for naming and storing physical coordinate data in a machine-readable format. It provides a solution for the current problem of physical addresses being difficult to interpret by computer systems, leading to incorrect directions.

In some embodiments, the present invention further comprises additional information related to the name and coordinate data, such as altitude, stored in a machine-readable format.

In some embodiments, the present invention comprises a software platform that correlates geolocation with data pertaining to latitude, domain, altitude, audit data, and relocation information.

In some embodiments, the present invention comprises a software platform for geolocation names that is capable of extension by adding new fields of data.

In some embodiments, the present invention comprises an API that may be used by external applications in order to retrieve geolocation information.

DETAILED DESCRIPTION

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

By assigning a name to a geolocation, we can increase accuracy and ease of use. There are several benefits:

Simplified use—Names are easy to say, write, and share, and their format is constant among languages. For example, although Spanish and English change the written order of physical address information, GNS names use the same format. (In the same way, email addresses are compatible among languages, especially since the adoption of Unicode).

Consistent use—Organizations can easily define GNS information, improving navigation and delivery. A simple domain.com:office can be used to reach a facility. If the company moves, they can simply update the GNS's underlying data, and new deliveries are routed correctly.

Figure 1:
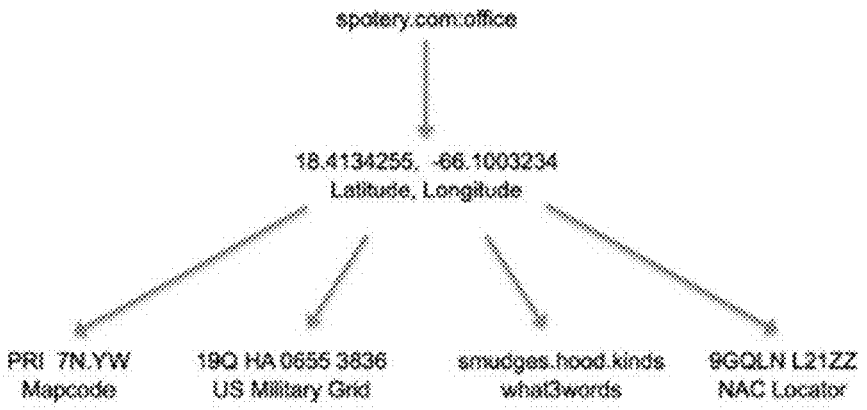
FIG. 1 shows a geo-name mapped to various grid alternatives.

Automated use—Contrary to current physical addresses that have to be converted to geolocations for use with most applications, GNS names have underlying computer-friendly information. Besides the latitude/longitude the invention can also provide translations to other grid systems, such as the U.S. Military Grid, Mapcode, or what3words, for compatibility, as seen in FIG. 1.

Extended use—The functionality of geo-names can be extended to other uses, for example, for assets (e.g., car, boat, bike). Assets can be named and associated to geolocations for management and tracking.

Dynamic capabilities—As you refer to a name, not a fixed location, the underlying data can be dynamically updated to changing conditions (e.g., moving homes, traveling, or, in the case of assets, their current location). A geoname for an asset like user@company.com!car can use the "current" keyword to get the latest registered geolocation at user@company.com!car:current. Other keywords can be used for tracking: "starting" or "destination". This is useful for tracking packages, equipment, and other devices in an Internet of Things (IOT) environment.

Programmable use—The use of geo-names and keywords can create additional opportunities for automation. For example, programming a schedule for a bike pickup at user@company!bike:current, delivering it to your user@company!bike:mechanic for maintenance, and then sending it back to user@company!bike:home after servicing.

Figure 2:
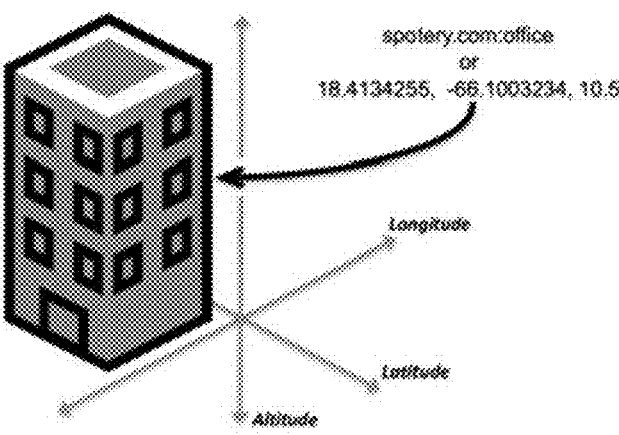
FIG. 2 shows how three coordinates (latitude, longitude, and altitude) may be correlated to an Internet domain.

Data layer—As see in FIG. 2, Another level of data can be added to maps that includes significant geolocations with aboveground/belowground (altitude) elevation information or indoor positioning. That information can be used to calculate population density and traffic. Foursquare uses foot traffic information to provide insights about businesses. The present invention uses data that can expand the analysis with additional supporting details, including authorized business or individual information.

In an exemplary embodiment of the present invention, geo-names can become as ubiquitous as emails or websites. You can reach a person at user@domain.com, www.domain- .com, or user@domain.com:work. These are computer-friendly and precise ways to reach a person. Physical addresses vary according to countries, so a standardized method of geolocation simplifies reaching a person for anyone in the world; similar to email, once you learn the format, you can email anyone anywhere.

The expected behavior in a GNS should be:

Geo-names are maintained by users—The present invention allows users to create their own geo-names. To accomplish that, already existing Internet domains or email addresses may be used to avoid trademark issues and improve security.

Organizations: Organizations can create names for their locations and make them public (walgreens.com: sanjuan, walgreens.com:ponce01).

Individuals: Personal geo-names are places of self-interest, such as home/work/school/parents/inlaws. Geo-names can also be used to track assets, and the underlying information can be dynamically updated.

Generic services: organizations or individuals without registered domains or emails can use generic service providers to create geo-names.

Privacy: There should also be a concept of private and public information. A business may want its information public and easily available, whereas individuals may want to protect information through authorizations. Privacy requires special attention as well as data management.

History must be stored—Changes to data should be stored to provide context for analysis or historical references. Using the geo-name will always return the latest information, but in cases where the information refers to a historical situation, the geo-name should return the value at that time. This allows for users to know where a place has its new offices or where a historical place used to be.

Refine the naming data structures—Although name, latitude, longitude, and altitude are the fundamental fields for the GNS, multiple additional fields provide additional information that may be needed to support expected future solutions, such as indoor positioning. Human-readable physical addresses, user/date audit data, and geolocation relocation information, among other fields, may be added if required to store historical, current, and future information.

Storage structures and processes—The GNS stores the naming information in persistent storage. In an exemplary embodiment, the storage structure can be a relational database, NoSQL database, and/or flat files. The processes that store the information can be written in Java or Node.js or even be blockchain-based.

Figure 3:
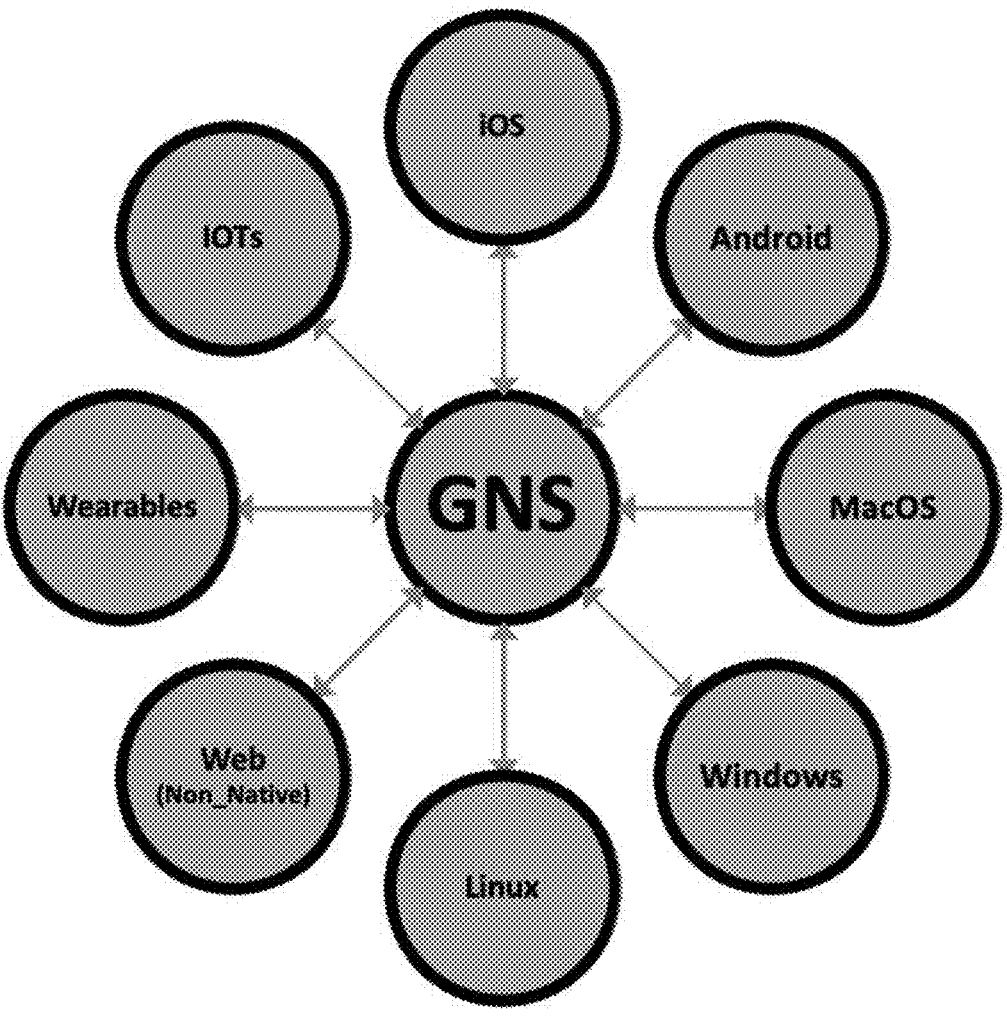
FIG. 3 shows how a GNS may be used as a service with various operating systems through an API.

API—As seen in FIG. 3, an API allows intercommunication between applications and is necessary for accessing, retrieving, and managing information from the GNS. The API defines the authentication/authorization process for accessing the GNS and the available procedures to interact with it. A trust relationship can be established with external applications to exchange basic information. Users have to explicitly grant permission to applications to request private data from the GNS. A simple integration from the launchpad with a leading app (e.g., Uber, Lyft, Waze) can showcase the power of geo-naming.

While the disclosure includes reference to specific embodiments, it will be understood by those skilled in the art that various changes may be made and equivalents may be substituted for elements thereof without departing from the true spirit and scope of the disclosure. In addition, many modifications may be made without departing from the essential teachings of the disclosure. When reference is made to specific known applications or systems, it will be understood by those skilled in the art that various substitutes and alternatives may be available.

What is claimed is:

1. A geolocation naming system (GNS) configured to dynamically manage geolocations and associated metadata, the system comprising:

(a) a geolocation database configured to store one or more geolocation entries, wherein each geolocation entry includes: (i) a geolocation identifier corresponding to a physical location within a defined coordinate grid system; (ii) a human-readable name associated with the geolocation identifier; and (iii) location information, including at least one of altitude information and relocation data;

(b) a dynamic update module configured to: automatically update the geolocation database in response to detected changes in a location's position or information, wherein such changes are received from external sources;

(c) a name-to-location binding mechanism configured to associate and update human-readable names with current location information for individuals, organizations, or assets;

(d) a data history module configured to log previous location information associated with each geolocation entry for historical tracking;

(e) an application programming interface (API) configured to: (i) enable integration of the geolocation naming system with external applications for accessing, retrieving, and managing location information; (ii) provide secure access to location information and support user authorizations; and (iii) facilitate communication between the geolocation naming system and external systems to enable geolocation search and updates;

(f) a query processing module configured to: (i) receive and process user queries for geolocation identifiers, human-readable names, or location-related information; and (ii) return query results based on data stored in the geolocation database; and (g) a security module configured to ensure compliance with user-defined preferences for data access and management, including controlling visibility and sharing of location information.

2. The geolocation naming system of claim 1, wherein the location information includes historical data for tracking changes to geolocation entries over time.

3. The geolocation naming system of claim 1, wherein the coordinate grid systems include at least one of: what3words, Plus codes, Mapcode, or U.S. Military Grid systems.

4. The geolocation naming system of claim 1, wherein the API enables retrieval of location information using search parameters including time of last update and proximity to a specified location.

5. The geolocation naming system of claim 1, wherein the query processing module supports proximity-based searches to identify geolocations within a specified area.

6. The geolocation naming system of claim 1, wherein the human-readable name is customizable by users to reflect personal or organizational preferences.

7. The geolocation naming system of claim 1, wherein the security module is further configured to provide authentication and authorization for external integrations via the API.

8. The geolocation naming system of claim 1, wherein the security module enforces user-defined privacy settings to control access to location information.

9. The geolocation naming system of claim 1, wherein the security module is further configured to maintain a record of changes to geolocation data.

10. The geolocation naming system of claim 1, further comprising an asset tagging module configured to assign and manage location names for movable assets, wherein the location associated with each asset can be dynamically updated.

11. The geolocation naming system of claim 1, wherein the query processing module supports keyword-based queries to retrieve contextual location information such as current, destination, or starting position.

12. The geolocation naming system of claim 1, further comprising a grid translation feature configured to convert coordinate data into one or more alternative grid system formats.

13. The geolocation naming system of claim 1, wherein the security module further comprises an access control module configured to manage public or private visibility of geolocation entries based on user-defined settings.

14. The geolocation naming system of claim 1, wherein the external sources include at least one of: user input, third-party applications, Internet-connected devices, Internet of Things (IoT) devices, or GPS.

15. A method for dynamically managing geolocations and associated metadata using a geolocation naming system, the method comprising:

(a) storing, in a geolocation database, one or more geolocation entries, wherein each geolocation entry includes: (i) a geolocation identifier corresponding to a physical location within a defined coordinate grid system; (ii) a human-readable name associated with the geolocation identifier; and (iii) location information, including at least one of altitude information and relocation data;

(b) automatically updating, via a dynamic update module, the geolocation database in response to detected changes in a location's position or information, wherein such changes are received from external sources;

(c) associating and updating human-readable names with current location information for individuals, organizations, or assets;

(d) logging previous location information associated with each geolocation entry for historical tracking;

(e) enabling integration of the geolocation naming system with external applications for accessing, retrieving, and managing location information via an application interface, including providing secure access to location information, supporting user authorizations, and facilitating communication between the geolocation naming system and external systems to enable geolocation search and updates;

(f) receiving and processing user queries for geolocation identifiers, human-readable names, or location-related information, and returning query results based on data stored in the geolocation database; and (g) ensuring compliance, via a security module, with user-defined preferences for data access and management, including controlling visibility and sharing of location information.

16. The method of claim 15, the location information includes historical data for tracking changes to geolocation entries over time.

17. The method of claim 15, wherein the coordinate grid systems include at least one of: what3words, Plus codes, Mapcode, or U.S. Military Grid systems.

18. The method of claim 15, wherein the external sources include at least one of: user input, third-party applications, Internet-connected devices, Internet of Things (IoT) devices, or GPS.

19. The method of claim 15, further comprising assigning and managing location names for movable assets using an asset tagging module, wherein the location associated with each asset is dynamically updated to reflect changes in the asset's position.

20. The method of claim 15, further comprising interpreting keyword-based terms associated with geolocation names during query processing to retrieve contextual information, including at least one of a current location, a destination location, or a starting location.

\* \* \* \* \*